No. 633,409. Patented Sept. 19, 1899.
W. H. ABERCROMBIE.
BICYCLE DRIVING MECHANISM.
(Application filed Aug. 17, 1897.)
(No Model.)
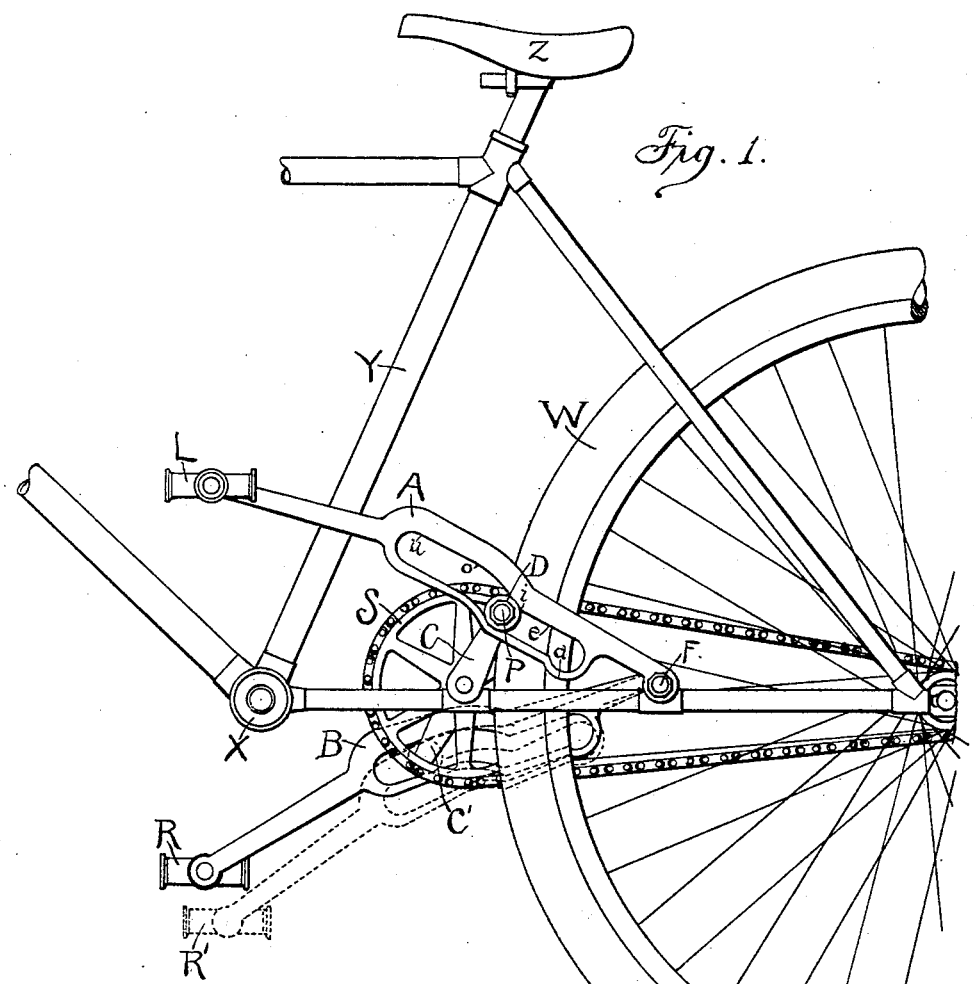
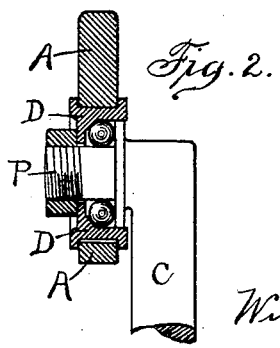
WITNESSES;
W. B. Keith.
J. J. Brown.
INVENTOR;
William H Abercrombie.
BY
G. W. Bullard.
ATTORNEY.
THE NORRIS PETERS CO., PHOTO-LITHO., WASHINGTON, D. C.

UNITED STATES PATENT OFFICE.

WILLIAM H. ABERCROMBIE, OF TACOMA, WASHINGTON.

BICYCLE DRIVING MECHANISM.

SPECIFICATION forming part of Letters Patent No. 633,409, dated September 19, 1899.

Application filed August 17, 1897. Serial No. 648,564. (No model.)

*To all whom it may concern:*

Be it known that I, WILLIAM H. ABERCROMBIE, a citizen of the United States, residing at Tacoma, in the county of Pierce and State of Washington, have invented a certain new and useful Improvement in Bicycle Driving Mechanism, of which the following is a specification.

My invention relates to that form of pedals made in the form of a lever, one end being pivoted on a fixed fulcrum and the foot-pedal attached to the other end with the means for driving the sprocket-wheel attached to the lever-arm between the fulcrum and the foot-pedal.

The objects of my invention are, first, to provide a means by which the rider may drive a bicycle by a more uniform and direct pressure of the foot than with a crank-pedal; second, to secure an easier movement of the feet and legs in working the pedals; third, to enable the rider at all times to exert a driving force on the sprocket-wheel, and, fourth, to prevent the cranks of the sprocket-wheel becoming set on a "center" at any time, so the rider cannot become powerless for an instant in driving his wheel. I attain these objects by means of the mechanism illustrated in the accompanying drawings, in which—

Figure 1 is a partial side view of a bicycle with my pedals attached. Fig. 2 is an enlarged sectional view of the crank-pin, showing the manner of fitting the pedal-arm to the crank of the sprocket.

My improvement is attached to a bicycle, preferably, by placing the sprocket-wheel between the arm of the lower fork of the bicycle-frame, as shown in Fig. 1. By so locating it the sprocket-wheel is between the bearings of its shaft, which enables it to better resist the strain put upon it. The chain belt is thus shortened, which lessens the weight and adds to its power, and the foot-pedals on the lever-arms are also placed in position for the easy and natural use of the feet and legs. The improvement may be attached with the sprocket located at its usual position in the angle-piece X. In this case it will be necessary to construct the bicycle-frame so that the center piece Y will be in a more upright position and the saddle Z in a natural position for the pedals. To do this, the frame will be constructed, preferably, with the angle-piece X placed nearer the rear wheel W of the bicycle.

My invention consists of the two lever pedal-arms A and B, as shown in Fig. 1. The rear end of A is pivoted to a fixed fulcrum F on the left arm of the lower fork of the bicycle-frame, and B is in like manner pivoted to the right arm of the fork. On the front end of each pedal-arm are placed the foot-pedals L and R.

In the body of each pedal-arm is a peculiarly eccentrically shaped opening or slot $a\,e\,i\,o\,u$. This slot is designed as a slide for the crank-pin P of the crank C of the sprocket-wheel S. The crank-pin is fitted to the slot by means of a circular rim or disk D, whose perimeter is grooved so as to fit into the slot, as shown in Fig. 2, and hold the pedal-arm in place on the crank-pin. The slot is enlarged at the rear end, as seen at $a$, so that the pedal-arm may be taken off the crank when desired. The construction and mounting of pedals, sprocket-wheel, and other parts of the bicycle in connection with my improvement does not differ from methods in common use.

In driving a bicycle with my invention the pedals are put in motion and the crank-pins travel back and forth in the slot $a\,e\,i\,o\,u$, which acts as an eccentrical slide to drive the cranks forward with the downward pressure of the foot.

The novelty of my invention consists of the peculiar form of the slot in which the crank-pins travel, for it will be seen that before the downward pressure of one foot ceases to drive the sprocket-wheel the other pedal is in a position to impart a driving force to the sprocket from the pressure of the foot working it. This will be understood by studying Fig. 1. The pedal-arm A is in position to receive the downward pressure on L. With the upward movement of the crank C the pin P has traveled from $o$ to $e$ and back to $i$, where the slot curves sharply upward to $o$. This sharp curve imparts a forward pressure to the disk D, loosely mounted on ball-bearings, and drives P forward before the pressure on R ceases to drive B against the pin of the crank C', for it is plainly seen that R will continue to impart a driving force until the position indicated by R' is reached, for each pedal can be made to drive its crank until P has traveled from $i$ to $u$ and back to $o$, when the pedal-arm begins to rise with the upward motion of P. By this means the rider can at all times impart a forward force to his wheel, and the cranks of his sprocket-wheel cannot at any time be caught on a center.

It is to be observed that when P is at $i$, it is much nearer the fulcrum F than when at $u$, and the pedal-arm will impart practically the same force to C while in the position shown at A as when C is in a horizontal forward position, a result that cannot be obtained with a crank-pedal. It will be seen that by means of my invention the rider can propel himself with a much more uniform effort than with crank-pedals. It is to be further observed that the proportions of the pedal-arms, the cranks, and other parts can be so varied as to secure any amount of force or any length of pedal-stroke desired. The pedals on a tandem bicycle may be so constructed that the lady's pedals may have a shorter stroke than those of the gentleman.

My invention is especially adapted to delivery bicycles and tricycles where the rider often propels a heavy load on his wheel. With my pedals he can drive his loaded wheel with much less effort and with more uniform exertion than with the crank-pedals now used.

Having described my invention, what I claim as new, and desire to secure by Letters Patent, is—

In a bicycle driving mechanism, the combination with the crank, of the lever pedal-arm formed with a slot to receive a part of the crank, said slot having a straight portion and being curved sharply upward substantially as shown so that the portion of the crank fitting in the slot will reach such sharply-curved portion before the crank is perpendicular, substantially as and for the purposes described.

In testimony whereof I affix my signature in the presence of two witnesses.

WILLIAM H. ABERCROMBIE.

Witnesses:
   G. W. BULLARD,
   IRA A. TOWN.